ID

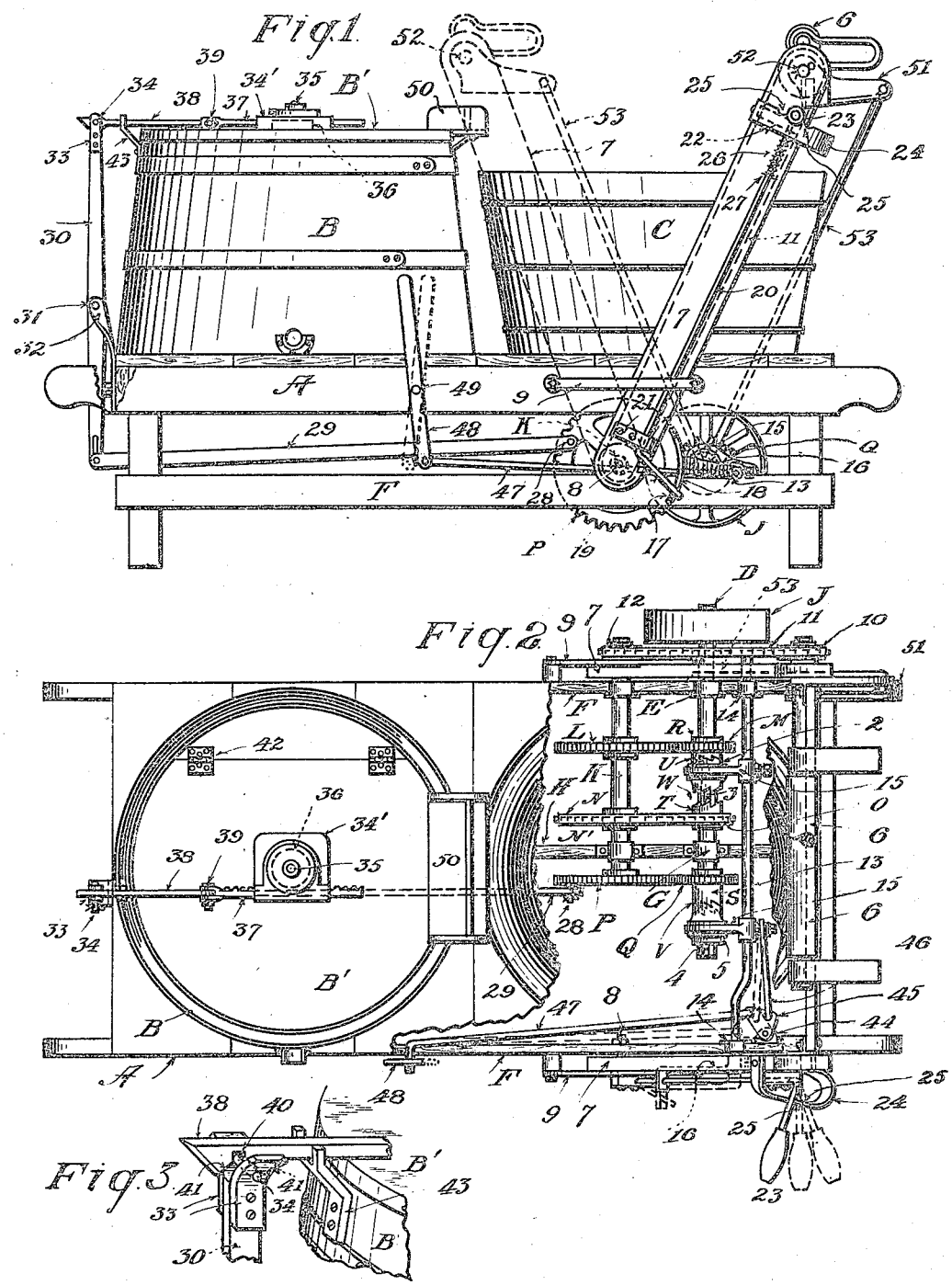

UNITED STATES PATENT OFFICE.

ALBERT R. HAAG AND GEORGE A. HAAG, OF PEORIA, ILLINOIS, ASSIGNORS TO JOHN ROCKE, OF PONTIAC, ILLINOIS.

CONTROL AND OPERATING DEVICE FOR DRIVEN MECHANISMS.

1,185,501.

Specification of Letters Patent.   Patented May 30, 1916.

Application filed October 30, 1911. Serial No. 657,518.

*To all whom it may concern:*

Be it known that we, ALBERT R. HAAG and GEORGE A. HAAG, citizens of the United States, residing at Peoria, in the county of Peoria and State of Illinois, have invented certain new and useful Improvements in Control and Operating Devices for Driven Mechanisms; and we do hereby declare that the following is a full, clear, and exact description of the invention, which will enable others skilled in the art to which it appertains to make and use the same.

This invention pertains to improvements in control and operating device for driven mechanisms.

It has especial reference to a structure for driving the washing mechanism and to the operation of a wringer including clutch mechanism by which either can be started or stopped.

It has especial reference, also, to a swinging frame for carrying the wringer, and to a gearing at the pivot of the said swinging frame for operating the wringer in either of its positions.

It has reference, also, to a wringer that can be swung on a supporting part from the washing tub to the rinsing tub so that the clothes can be wrung from the former into the latter and then from the latter into the basket or other receptacle from which the clothes are removed to be dried, the power being applied to the wringer from a driving part operated from mechanism at the pivot of the said supporting part.

Other advantages will appear herein as the description proceeds and to the end that the invention may be understood I provide the accompanying drawing, in which:

Figure 1 is a side elevation of the complete machine showing a wringer-holding portion in two extreme positions. Fig. 2 is a plan of the same with parts broken away to show the gearing beneath, and Fig. 3 shows, in perspective, certain operating parts.

A indicates a suitable bench and B and C represent a wash-tub and rinsing-tub, respectively, both mounted on said bench. The tub B is preferably secured in position in any suitable manner and the tub C may likewise be fixed or may be movable as desired.

D is a drive shaft having a bearing at E on one of the lower side rails F of the bench and having a bearing also at G on a middle rail H shown in Fig. 2, and is provided with a suitable driving pulley J. Also journaled upon the same members F, H, is a counter-shaft K which carries a fixed gear L to mesh with a pinion M rotatably carried on the said shaft D. Adjacent the gear L and secured on said shaft K is a sprocket N and opposite it on the shaft D is a loose sprocket O, a chain N' running upon both. Also on the countershaft K is a loose gear P to mesh with a pinion Q on the said driving shaft D, the two pinions M and Q and the sprocket O including clutch portions R S, T and all of which are loosely mounted on the said shaft D as stated, each having suitable teeth U, V, W respectively, the teeth U and W facing each other. Mounted on said shaft D to rotate with it between the parts R T is a clutch sleeve 2 by means, for example, of a feather and key-way, and which has a longitudinal shifting movement whereby it may engage one or the other of the said clutch portions R T, being provided at each end with corresponding teeth for that purpose. Mounted also on the shaft D to turn therewith, as by means of a feather 4, and also shiftable along said shaft, is a clutch sleeve 5 provided with teeth corresponding to those of the clutch portion S.

A wringer, whose rollers are indicated at 6 in Fig. 2, is suitably carried at the upper end of two arms 7 forming a frame, whose lower ends are pivotally mounted at opposite sides of the bench. One of said arms is mounted upon the outer end of the shaft K, for example, while the other is pivotally supported in any suitable manner by means, for example, of a bolt 8 suitably carried by an opposite rail F. These arms are adapted to swing to two extreme positions, indicated in Fig. 1, there being a suitable inclosing portion or yoke such as a strap 9 spaced from and secured to the bench A at each side as clearly shown, this structure serving to limit the throw of the arms and to support the wringer-frame in either of the said two extreme positions. The wringer is thus adapted to either overhang that edge of the tub B adjacent the tub C, or to overhang the outer or opposite edge of the latter so that, as stated hereinbefore, the clothes may be wrung from either tub as occasion demands.

Upon the shaft of one of the rollers is secured a sprocket wheel 10 driven through a chain 11 from a sprocket 12 on the shaft K on which the frame 7 is partially supported. It is the desire to impart both directions of rotation to the wringer through the countershaft K by the proper adjustment of the clutch-member 2. A further desire is to impart movement to the mechanism of the washing machine or tub B through the clutch 5; the connection to the said tub to be explained later. That this desire may be realized a shifting-rod 13 is mounted in suitable bearings 14 on the side rails F, and this is provided with two forks 15. These lie between the flanges of the said clutch members 2 and 5 in the usual manner. One end of the rod 13 is provided with an arm 16. The arm has an extension 17 provided with a vertically extending slot 18 through which extends an arm 19 of a rock-shaft 20 having bearings at 21 and 22, Fig. 1, on the side of the adjacent arm 7. The upper end of said rock-shaft 20 has a handle 23 adapted to seat in any one of a series of notches 25 in the upper edge of a member 24 secured on said arm 7. An expanding spring 26 on said rock-shaft is held between the upper bearing 22, for example, and a pin 27 in said shaft. This holds the handle of the shaft positively at any of the notches 25. By reference to Fig. 1 it will be observed that a rocking movement of said shaft 20 will shift the rod 13 in the direction of its length causing the fork 15 to shift the clutch member 2. The extremes of movement indicated in Fig. 2 will cause the clutch 2 to engage one or the other of the clutch portions R T while the middle position will be a neutral one, or that in which the said clutch member 2 will lie midway between said clutch portions, and the shaft D therefore, cannot drive the shaft K which must remain idle. It is observed, also, that the clutch members last referred to while rotating in the same direction must impart different directions of rotation to the shaft K through the gears L M, and the sprockets N O.

The structure for operating the washing machine and the manner of controlling the same will now be explained:—The gear P before referred to carries a wrist-pin 28 to which is attached one end of a pitman 29 whose other end has connection with a lever-arm 30 pivoted at 31 upon a suitable bracket 32 of the bench A. Secured to the opposite end of the lever arm, as shown in Fig. 3, are two portions 33 between which is carried a pin 34. On the top B' of the tub B is secured a casting 34' through which extends a shaft 35 which carries, within the tub, any suitable or usual device for agitating the clothes. Said shaft carries, for example, a pinion 36 indicated in broken lines. A rack-bar 37 engages said pinion and imparts an oscillating movement to said shaft due to a rocking movement of the lever-arm 30 with which the rack-bar is connected through an arm 38. This last named arm is pivoted to said rack-bar at 39 and is adapted for a vertical movement thereon. The outer end of the said arm 38, as shown in said Fig. 3, is provided in its lower edge with a notch 40 to receive the pin 34, the arm at each side of the notch being cut away at an angle as shown at 41 in both continuous and broken lines, while the extreme end is beveled at an opposite angle as clearly shown, as also is that part of the arm lying inward from the said notch. The said top B' is hinged at 42 and in raising on its hinges the arm 38 can be lifted from the pin 34 while the arm 30 is in motion. When the top is replaced the notch 40 of the arm 38 though perhaps not first engaging the pin 34 will finally do so due to the beveled surfaces of said arm, which in meeting said pin, will cause the arm to raise and finally fall into position. Secured on the side of the tub B is a guiding fork 43 which prevents lateral movement of the said arm.

As previously stated, the gear P is rotatable on the shaft and is driven by the pinion Q through the rotating clutch-member 5 on the shaft D. The fork 15 for operating the clutch slides along the shifting rod 13 and movement is imparted to it by the structure now to be explained. Secured to the inner side of one of the rails F is a bracket 44 to which is pivoted one corner of a triangular plate 45 one of whose other corners carries one end of the rod 46 whose other end is loosely connected to said fork 15. The third corner receives one end of a shifting rod 47 attached to the lower end of a lever 48 pivoted at 49 on the side of the bench A. When the clutch 5 is thrown into engagement with the clutch-sleeve S the triangular plate has the position shown in continuous lines and it is observed that in that position the rod 46 and the plate constitute a toggle and a lock since the point of connection of said rod 46 with said plate has passed beyond the pivot point of the latter, and the clutch is thus held in driving engagement until released by moving the lever 48 to its opposite position placing the parts in the position shown in broken lines. It is noted that the shaft K may rotate without driving the gear P and the latter may, therefore, rotate on the shaft even when said shaft is revolving in an opposite direction.

We have indicated a shelf 50 on the side of the tub B. The wringer in one of its positions lies above the shelf which constitutes an aid to the easy handling of the clothes and serves to keep the latter clean.

The wringer can be swung to either position without disengaging the clutch 2 and, also, the contents of the tub B may be observed by lifting its top B' without disengaging the clutch 5 the driving mechanism working without interruption in any position of any of the parts. It is observed that the lower ends of the arms 7 which carry the wringer have such a position on the bench that in the extremes of movement thereof the wringer is brought to the most convenient working positions and since the wringer must preserve an upright position at either extreme of movement a suitable arrangement for that purpose is provided, such as mounting said wringer upon a member 51 having its pivot at 52 upon the arms 7. Connected to the outer free end of the member is a rod 53 whose lower end is suitably held upon the shaft D for example. The length of the rod is substantially equal to the distance between the axis of the said shaft K and the point of support at 52 and it lies parallel to a line drawn between these points so that in the movement of the arms and the rod the latter holds the wringer in an upright position at either extreme position or even in intermediate ones. Since the rock-shaft 20 moves with the arms 7 in reaching the extreme positions, the arm 19 of the same will describe an arc of movement within the slot 17 of the part 18. Said slot must, therefore, be of sufficient length to admit of this movement but in any position the said arm will impart the desired shifting movement to the rod 13.

In order to provide for wringing the clothes from the "rinsing-tub" from the side of the latter farthest from the "washtub" the arms 7 are placed at such a position beneath the rinsing-tub that the wringer can swing freely from the edge of one tub to the far edge of the other as clearly indicated. For this reason the members or arms 7 must be long enough to admit of that movement.

The wringer must be kept upright or substantially so in order to conveniently feed the clothes between its rollers and this is provided for automatically through the rod 53, its pivot point at its lower end and the arm 51. Also the wringer-rolls must be driven at either position and this is conveniently done from a common or central point which is the shaft K whose sprocket 12 through the chain 11, or the equivalents of these, supply the driving power. Again, by employing the shifting clutches 2 and 5, and the parts coacting with them, it is possible to operate the wringer in both directions and the washing machine can be operated during either direction of its rotation, or permitted to remain idle, or the wringer may remain idle while the washer is in operation.

If the clutch 2 is midway between and does not engage either of the parts R and T the wringer will be idle but if in engagement with either it will be operated. And if the clutch 5 is in engagement with the part S the washer will operate.

Equivalents for the parts of the mechanism for producing the various operations may be adopted, of course, such as will fairly fall within the spirit of the invention and its claims.

Having thus described our invention, we claim:

1. In combination, a support, a member pivoted thereon and uprising from its pivot, a mechanism carried by the member above the pivot, a drive-wheel having its axis of rotation substantially coincident with the axis of the pivot of the member, means to operate said mechanism from said drive-wheel, and means to reverse the direction of rotation of the latter.

2. The combination of mechanism, a swinging member upon which the mechanism is mounted, a drive-wheel substantially at the pivot of said member, means for operating said mechanism from said drive-wheel including gearing to reverse the direction of rotation of the latter, and means to operate the said reversing gearing to reverse the direction of rotation of the mechanism.

3. The combination of a platform, a member pivoted thereto and uprising from its pivot, a mechanism carried by the member, a driving wheel for the mechanism having its axis of rotation at the pivot of the member, a wheel carried by the mechanism including a driving part running upon both the wheels, means in control of and for reversing the rotation of the first described wheel including a clutch, and a part carried by the member having control of the clutch.

4. In a machine of the character described, a main frame, a supplemental frame pivotally mounted thereon, a support for an operating means pivotally mounted on said supplemental frame, said supplemental frame being adapted to be moved to different angles relative to a perpendicular line through its pivot to position said operating means at different positions relative to said main frame so as to adapt said operating means to operate on the same work during different stages of its treatment, means for maintaining the mechanism support in position to maintain the operating means permanently in a substantially vertical position, a power driven element, and connections between said power driven element and said operating means, said connections including a reversing means so arranged as to drive said operating means in its adjusted positions in either direction as desired.

5. In a machine of the character described, a main frame, a supplemental frame pivotally mounted thereon, a support for an operating means pivotally carried in the upper portion of said supplemental frame, an operating means mounted on said support, said supplemental frame being adapted to be moved to positions on either side of a perpendicular line through its pivot to position said operating means at different positions relative to said main frame so as to adapt said operating means to operate on the same work during different stages of its treatment, means for maintaining the operating means in substantially vertical position in the various positions of adjustment of the supplemental frame, a power driven element and connections between said power driven element and said operating means, said connections including reversing means so arranged as to drive said operating means in its adjusted positions in either direction as desired.

6. In a machine of the character described, a main frame, a supplemental frame pivotally mounted thereon, an operating mechanism support pivoted to said supplemental frame, an operating mechanism mounted on said support, means for holding the mechanism support in such position that the operating means will be maintained in a substantially perpendicular position, actuating means for said operating means, said actuating means including a power driven element and a plurality of rotary members and connections between said rotary members and said operating means, said connections being so arranged that when one of said rotary members is driven directly by said power driven element, said operating means will be driven in one direction, and when the other of said rotary members is driven directly by said power driven element, said operating means will be driven in the opposite direction, said power driven element being normally out of operative relation with said rotary members and being adapted to be placed in operative position with either of said rotary members.

7. In combination, a support, a member pivoted thereto and uprising from its pivot, an operating mechanism pivotally mounted on the outer portion of said member, means for maintaining said mechanism in substantially a vertical position when said uprising member is moved to different positions, a drive wheel having its axis of rotation substantially coincident with the axis of the pivot of the member, means to operate said operating mechanism from said drive wheel, and means adapted for reversing the direction of rotation of said mechanism and for interrupting said rotation.

8. In combination, a support, a member pivoted thereto and uprising from its pivot and movable to different positions relative to said support, an operating mechanism pivotally mounted on said pivoted member, means operable through the movement of said pivoted member to maintain said operating mechanism permanently in a substantially vertical position.

In testimony whereof we affix our signatures, in presence of two witnesses.

ALBERT R. HAAG.
GEORGE A. HAAG.

Witnesses:
W. I. SLEMMONS,
L. M. THURLOW.